(12) United States Patent
Tsorng et al.

(10) Patent No.: US 11,549,640 B2
(45) Date of Patent: Jan. 10, 2023

(54) RETAINER ASSEMBLY FOR A STRUCTURE

(71) Applicant: Quanta Computer Inc., Taoyuan (TW)

(72) Inventors: Yaw-Tzorng Tsorng, Taoyuan (TW);
Ming-Lung Wang, Taoyuan (TW);
Hong-Yi Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 197 days.

(21) Appl. No.: 17/139,164

(22) Filed: Dec. 31, 2020

(65) Prior Publication Data
US 2022/0107052 A1 Apr. 7, 2022

Related U.S. Application Data

(60) Provisional application No. 63/086,309, filed on Oct. 1, 2020.

(51) Int. Cl.
*F16M 11/00* (2006.01)
*F16M 13/02* (2006.01)

(52) U.S. Cl.
CPC .............................. *F16M 13/022* (2013.01)

(58) Field of Classification Search
CPC .... F16M 13/022; F16M 11/041; F16M 13/02; F16M 11/22
See application file for complete search history.

(56) References Cited

U.S. PATENT DOCUMENTS

| | | | | |
|---|---|---|---|---|
| 9,347,213 | B1* | 5/2016 | Zhang | E04C 3/09 |
| 11,181,225 | B2* | 11/2021 | Kawaguchi | H04N 5/64 |
| 2016/0003270 | A1* | 1/2016 | Franklin | H01F 7/0221 |
| | | | | 439/529 |
| 2019/0249402 | A1* | 8/2019 | Whitfield | F16M 13/022 |
| 2021/0278029 | A1* | 9/2021 | Ho | F16M 11/046 |

* cited by examiner

*Primary Examiner* — Amy J. Sterling
(74) *Attorney, Agent, or Firm* — Nixon Peabody LLP

(57) ABSTRACT

A retainer assembly includes a bracket, a base, a plate and a security pin. The bracket includes a front section of the bracket that forms apertures configured to each receive a fastener. The base includes a projection. The plate is located between the base and the bracket. The plate forms apertures configured to each receive a fastener. The plate further forms an aperture being configured to receive the projection extending from the base. The plate rotates in the retainer assembly from a first position to a second position. The security pin is securely mounted on the base. The security pin moves from a first position to a second position to inhibit the plate from rotating from its second position back to its first position.

20 Claims, 15 Drawing Sheets

RETAINER ASSEMBLY FOR A STRUCTURE

CROSS-REFERENCE TO RELATED APPLICATIONS

This application claims priority from and benefit of U.S. Provisional Patent Application Ser. No. 63/086,309, filed on Oct. 1, 2020, titled "Tool-less Retainer For Outdoor Communication Equipment," which is hereby incorporated by reference herein in its entirety.

FIELD OF THE INVENTION

The present invention relates generally to a retainer assembly, and more specifically, to a tool-less retainer assembly that securely protects structures such as outdoor communication equipment.

BACKGROUND OF THE INVENTION

Common outdoor electronic equipment is usually fixed on a pole with a bracket. In one type of system, the brackets are fixed or installed on a pole by bolts and nuts. For example, a first bracket is on one side of a pole and a second bracket is on the other side of the pole, and respective bolts and nuts secure the brackets together and surround the pole. In another type of system, the brackets are fixed or installed by steel band clamps. For example, a bracket has a plurality of openings at a top section and at a bottom section thereof, and the steel band clamps extend through the openings and surround the pole. In these two installation methods, an installer needs to hold the electronic systems in the air, and then lock and fix the brackets on the pole. This can be difficult and time-consuming to install. Furthermore, there are no security or theft-resistant features in the systems to assist in inhibiting or preventing theft of such systems.

The present disclosure is directed to an improved retainer assembly that overcomes the above disadvantages of the existing brackets and installation methods.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one aspect of the present disclosure, a retainer assembly includes a bracket, a base, a plate, and a security pin. The bracket includes at least a front section, a first side and a second opposing side. The front section of the bracket forms a plurality of fastener-receiving apertures configured to each receive a fastener therethrough. The base includes a projection extending therefrom. The plate is located between the base and at least a portion of the bracket. The plate forms a plurality of fastener-receiving apertures configured to each receive a fastener therethrough. The plate further forms an aperture being configured to receive the projection extending from the base. The plate is configured to rotate in the retainer assembly from a first position to a second position. The security pin is securely mounted on the base. The security pin is configured to move from a first position to a second position to inhibit the plate from rotating from its second position back to its first position.

According to a configuration of the above implementation, the retainer assembly further includes a plurality of fasteners configured to extend through the plurality of fastener-receiving apertures formed in the bracket, and the fastener-receiving apertures are formed in the plate. The retainer assembly may further include an electronic device being located adjacent to the bracket and opposite of the plate. The electronic device secures the plurality of fasteners.

According to another configuration of the above implementation, the bracket of the retainer assembly further includes at least one back section opposite of the front section, and the bracket further forms a plurality of apertures configured to assist in attaching the retainer assembly to a structure. The at least one back section of the bracket in one embodiment may be a plurality of back sections. In this embodiment, the plurality of apertures formed in the bracket is configured to assist in attaching the retainer assembly to the structure is formed in the plurality of back sections of the bracket.

In a further aspect of the above implementation, the plate is configured to rotate less than about 45 degrees. In another implementation, the plate is adapted to rotate from about 15 to about 45 degrees, and in another implementation from about 15 to about 30 degrees.

In yet a further aspect of the above implementation, each of the plurality of fasteners is a bolt.

In another aspect of the above implementation, the plate further includes a plurality of elongated notches. At least one of the plurality of elongated notches and the security pin assist in securing the plate in the second position.

According to a further configuration of the above implementation, the security pin includes a spring. The security pin may further include a flange, and the base may further form an indentation therein. The indentation is configured to receive at least a portion of the security pin. The flange and the indentation assist in controlling the movement of the security pin.

According to one method, a retainer assembly is assembled and secured to a structure. A component is provided with a plurality of fasteners secured thereto. A bracket is provided that includes at least a front section, a first side, and a second opposing side. The front section of the bracket forms a plurality of fastener-receiving apertures. The bracket further forms a plurality of apertures for assisting in securing to the structure. The bracket is secured to the structure via the plurality of apertures of the bracket. A base is provided and includes a projection extending therefrom and also includes a security pin mounted thereon. A plate is provided. The plate forms a plurality of fastener-receiving apertures and an aperture being configured to receive the projection extending from the base. The plate is located between the base and at least a portion of the bracket. The plate is located on the projection of the base via the aperture formed in the plate. Each of the fasteners extends through a respective one of the fastener-receiving apertures formed in the bracket; and through a respective one of the fastener-receiving apertures formed in the plate. After the fasteners have extended through each of the respective one of the fastener-receiving apertures formed in the bracket and the plate, the fasteners are moved from a first position to a second position resulting in the plate rotating from the first position to the second position. The security pin is moved from a first position to a second position so as to lock the plate in the second position and secure the component.

In a further aspect of the above method, the bracket is secured to the structure using at least one cable tie through the apertures formed in the bracket and around the structure. The at least one cable tie is a plurality of cable ties in one embodiment.

In a further aspect of the above method, the structure is a pole. The component in one embodiment is an electronic device.

In another aspect, the method is performed in the absence of tools.

In another aspect of the method, the plate is adapted to rotate from about 15 to about 45 degrees, or from about 15 degrees to about 30 degrees.

In a further aspect of the method, the security pin includes a spring and a flange. The base further forms an indentation therein configured to receive at least a portion of the security pin. The flange and the indentation assist in controlling the movement of the security pin.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

Figure 1:
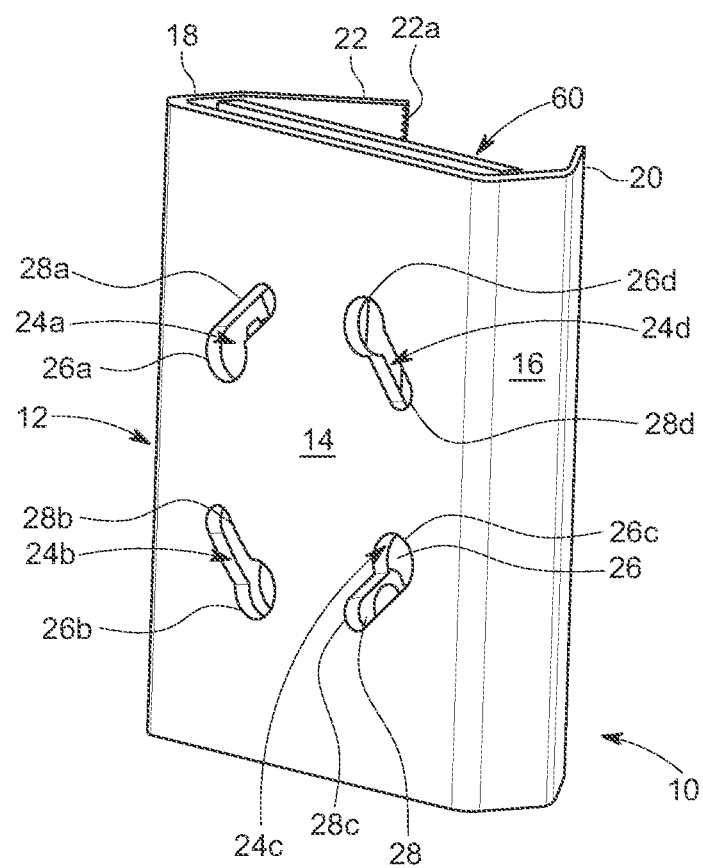
FIG. 1 is a front perspective view of a retainer assembly, in accordance with one embodiment of the present disclosure.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 2:
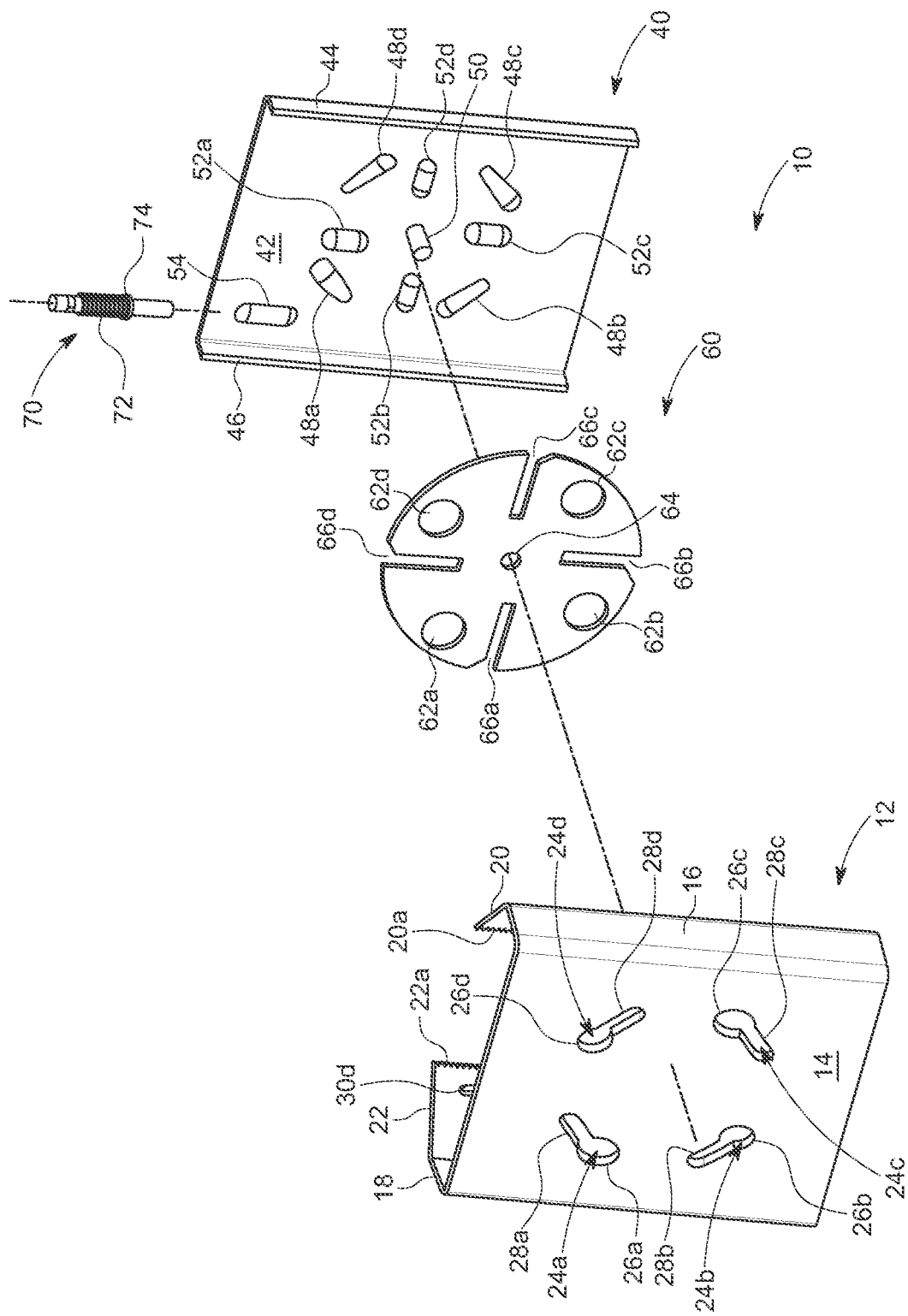
FIG. 2 is an exploded view of the retainer assembly of FIG. 1.

FIGS. 1 and 2 illustrate a retainer assembly 10 that is configured to retain and secure components (e.g., electronic devices). Non-limiting examples of components that may be retained include electronic devices. The electronic device may be communication equipment. Some non-limiting examples of electronic devices that may be used include, but are not limited to, antennas, AAU (Active Antenna Unit), RRU (Remote Radio Unit), or DU (Distributed Unit). Typically, these components are located in an outdoor environment. The retainer assembly may be used in other locations such as in indoor locations.

The retainer assembly of the present invention is easy for a user to mount and install, as well as service, if needed. The retainer assembly also can reduce the time for installing the component (e.g., electronic device) in the air. The present invention is also advantageous in that it may be assembled in the absence of tools. Additionally, the component (e.g., electronic device) is difficult, if not impossible, to remove from the retainer assembly after being installed without using a specialized tool.

The retainer assemblies of the present invention are adapted to be mounted and secured to a structure such as, for example, a pole. It is contemplated that the retainer assemblies may be secured to other structures such as a pylon or a derrick.

Figure 3:
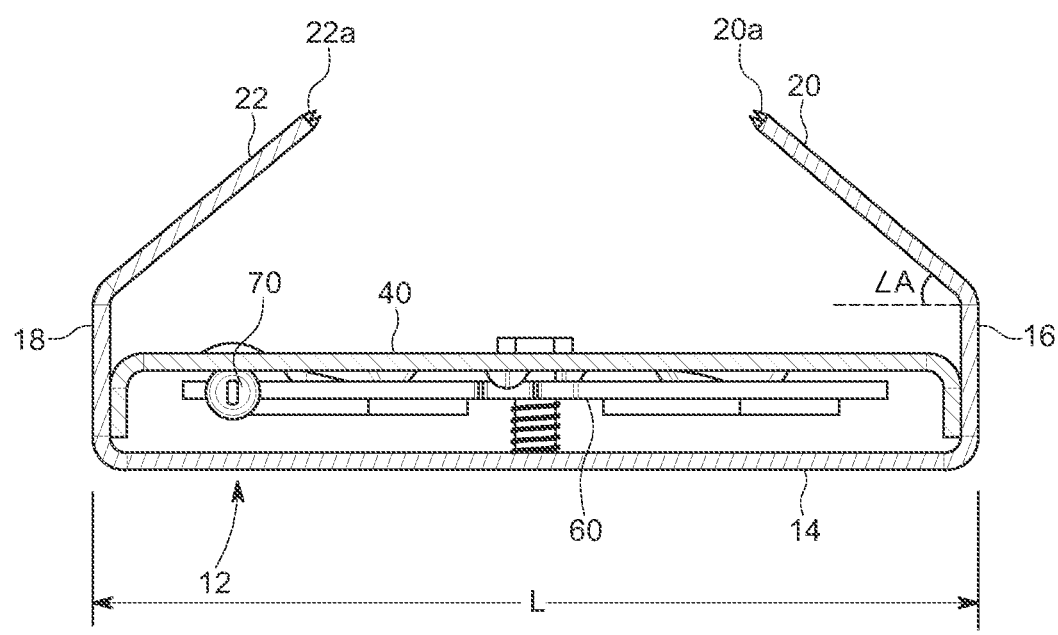
FIG. 3 is a top view of the retainer assembly of FIG. 1.

FIG. 1 illustrates the retainer assembly 10 in an assembled view, FIG. 2 is an exploded view of the components in the retainer assembly of FIG. 1, and FIG. 3 illustrates a top view of the retainer assembly 10. Referring specifically to FIG. 1, the retainer assembly 10 includes a bracket 12, which further includes a front section 14, a first side 16, a second opposing side 18, and a plurality of back sections 20, 22. The back sections 20, 22 are located opposite from the front section 14. The front section 14 of the bracket 12 forms a plurality of fastener-receiving apertures 24a-24d configured to each receive a fastener therethrough.

Referring specifically to FIG. 2, the retainer assembly 10 further includes, in addition to the bracket 12, a base 40, a plate 60, and a security pin 70. The base 40 further forms an indentation 54 therein configured to receive at least a portion of the security pin 70, as will be discussed below.

Each of the plurality of fastener-receiving apertures 24a-24d includes a respective first general area 26a-26d and a respective second general area 28a-28d. Each first general area 26a-26d is shaped and sized to allow a fastener and, more specifically, a head of a fastener to extend therethrough. Each second general area 28a-28d is a curved, narrowing area or slit that is sized to prevent or inhibit the head of a fastener from extending therethrough. The curved portion of the second area 28a-28d correlates with the movement or rotation of the plate 60 as will be discussed in detail below.

The base 40 includes a front section 42, a first side 44 and a second opposing side 46. The front section 42 of the base 40 forms a plurality of projections 48a-48d thereon. The projections 48a-48d assist in pushing the fasteners and the plate 60 to the bracket 12. The projections 48a-48d also assist in compressing the spring 72 (see also FIG. 5) to make a clamp force to the fasteners, which can assist in fixing the fasteners in a second position. The base 40 further includes a projection 50 extending therefrom that is adapted to receive the plate 60. The projection 50 may be a bolt, screw or a hinge pin. The base 40 also includes a plurality of projections 52a-52d. The projections 52a-52d can limit the positioning of the plate 60 when in a first position. The base 40 further forms an indentation or groove 54 therein configured to receive at least a portion of the security pin 70 as will be discussed below.

Before the fastener is inserted through the fastener-receiving apertures, the base 40 is attached to the bracket 12. The base may be attached to the bracket by welding in one embodiment. In another embodiment, the base may be attached to the bracket with fasteners, such as bolts or screws. In such an embodiment, the sides of the bracket and the sides of the base would typically be longer to more easily attach the bracket and base.

Referring to FIG. 3, the first and the second opposing sides 16, 18 of the bracket 12 are shown as being generally perpendicular to the front section 14 of the bracket 12. It is contemplated that the first and second opposing sides of the bracket may extend at an angle with respect to a front section of the bracket. For example, the first and second opposing sides may flare outwardly or inwardly with respect to the front section of the bracket.

Furthermore, the back sections 20, 22 of the bracket 12 extend inwardly from respective first and the second opposing sides 16, 18. The back sections 20, 22 extend inwardly from the first side or second side 16, 18 at an angle A of from about 20 to about 75 degrees and, more specifically from about 30 to about 60 degrees. The back sections 20, 22 are desirably angled when the structure (e.g., pole) is less than a certain diameter. For example, the back sections 20, 22 are angled in the embodiment where a length L of the retainer assembly is about 162 mm and the structure has a diameter of 100 mm. It is contemplated that the back sections may extend generally perpendicular to the first and second opposing sides depending on the cross-sectional size of the structure. The back sections 20, 22 also forms respective saw-toothed edges 20a, 22a to assist in securing the retainer assembly 10 to the structure.

In one embodiment, the front section 14, the first and second opposing sides 16, 18, and the plurality of back sections 20, 22 of the bracket 12 are integrally formed with each other. It is contemplated that the bracket may be formed from separate components and secured together in another embodiment.

In another embodiment, it is contemplated that the back section of the bracket may include exactly one back section. Thus, the bracket includes at least one back section opposite of the front section.

Figure 4A:
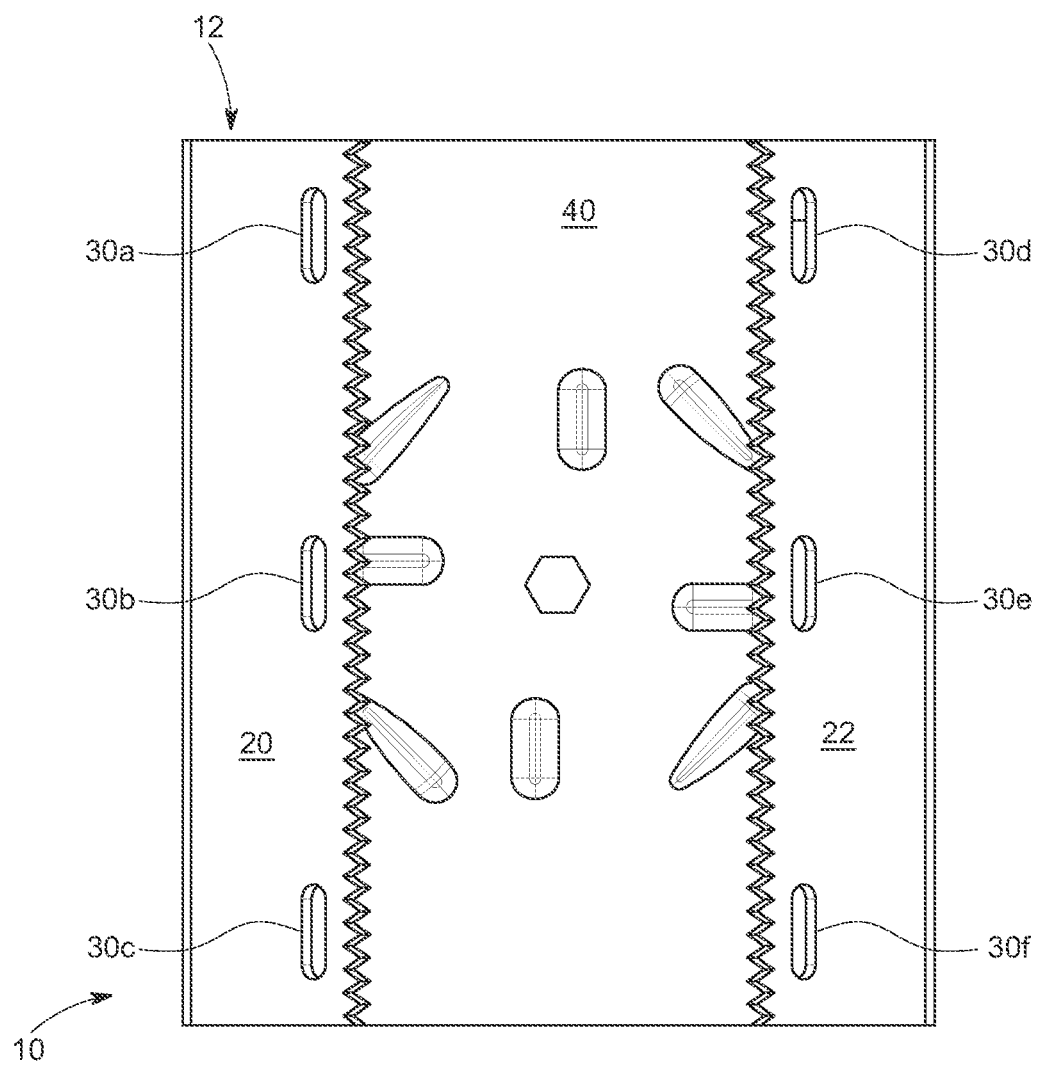
FIG. 4A is a back view of the retainer assembly of FIG. 1.
Figure 4B:
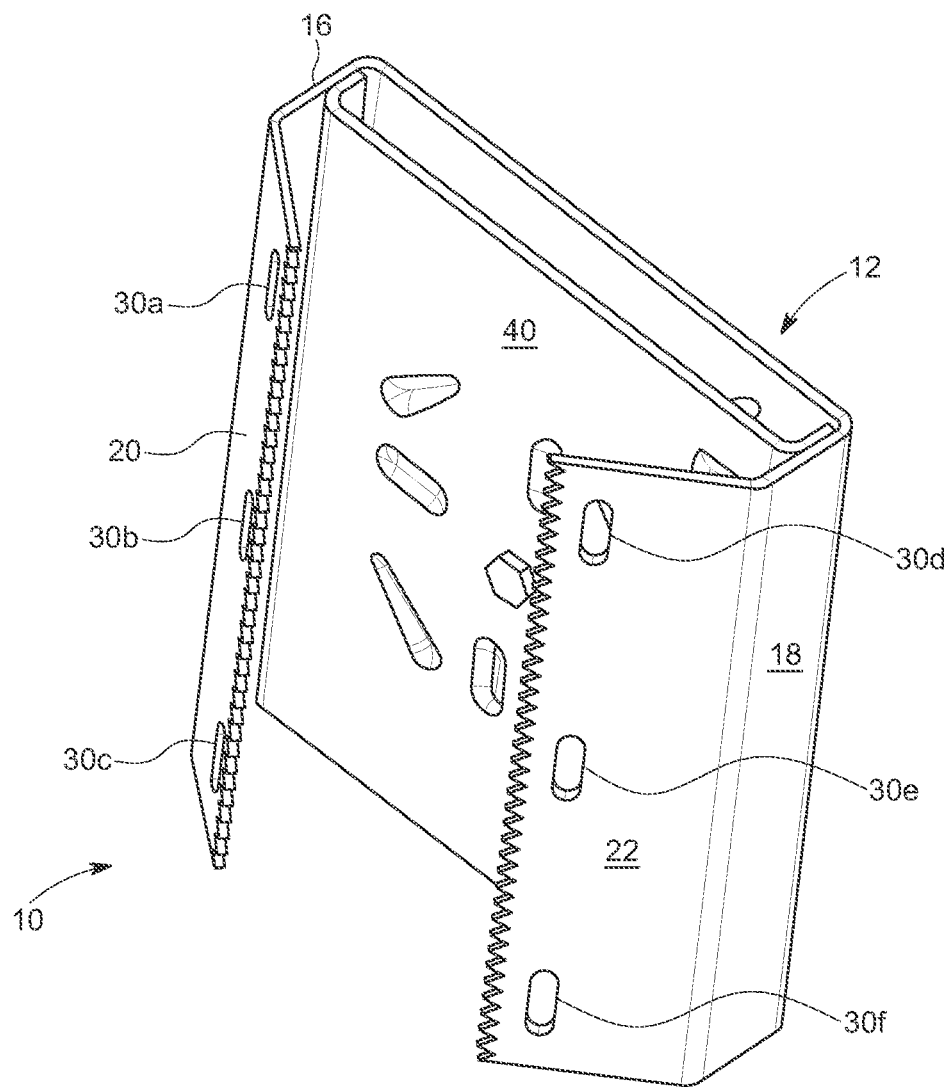
FIG. 4B is a back perspective view of the retainer assembly of FIG. 1.

Referring to FIGS. 4A and 4B, the bracket 12 further forms a plurality of apertures 30a-30f configured to assist in attaching the retainer assembly 10 to a structure, as will be discussed below. The plurality of apertures 30a-30f is located in one of the back sections 20, 22.

In another embodiment, it is contemplated that the plurality of apertures configured to assist in attaching the retainer assembly to a structure may be located on the first and second opposing sides. This may be the case when the retainer assembly is secured on larger structures (e.g., poles). It is also contemplated that the plurality of apertures configured to assist in attaching the retainer assembly to a structure may be located on one or more of the first and second opposing sides, and on one or more of the back sections of the bracket.

Figure 5:
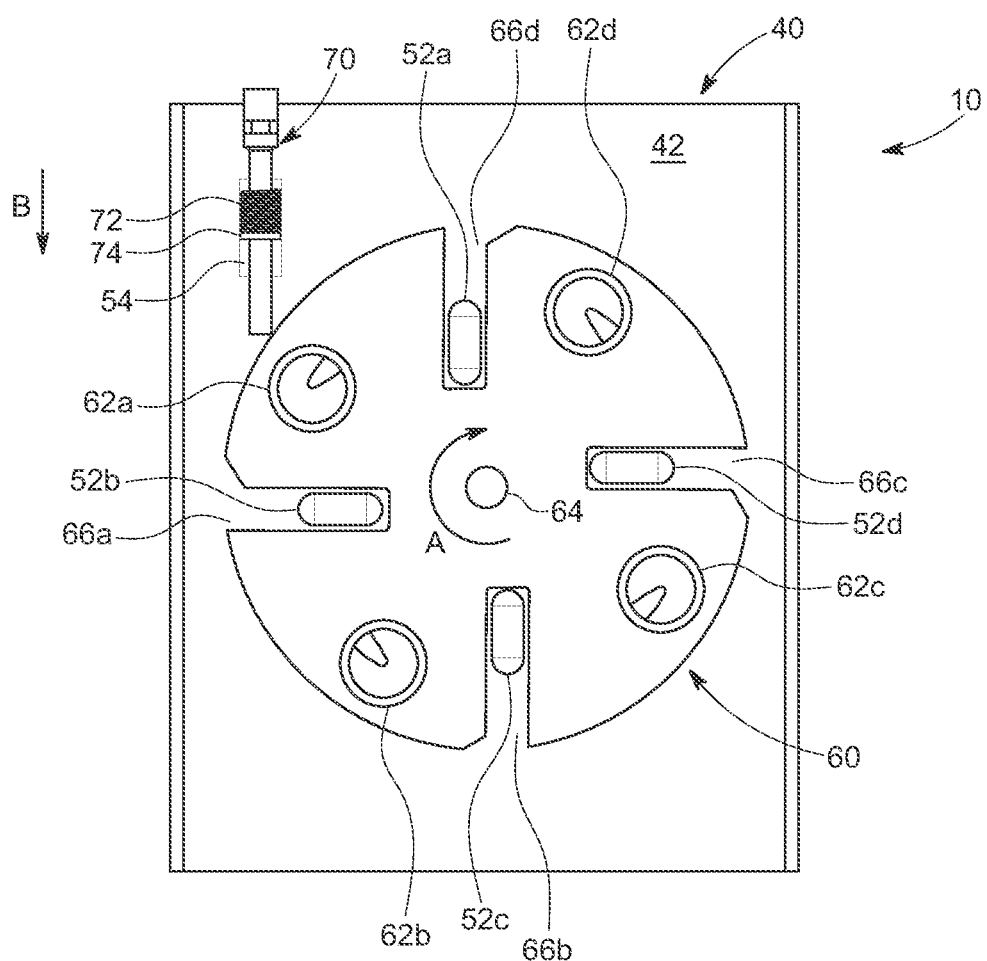
FIG. 5 is a front view of an interior section of the retainer assembly of FIG. 1 with the plate being positioned on the base in a first position, in accordance with one embodiment of the present disclosure.

Referring to FIG. 5, the plate 60 is located between the base 40 and, as shown best in FIG. 3, at least a portion of the bracket 12. The plate 60 forms a plurality of fastener-receiving apertures 62a-62d therein, each of which is configured to receive a fastener therethrough. The plurality of fastener-receiving apertures 62a-62d is in a generally circular shape. The plurality of fastener-receiving apertures 62a-62d is shaped and sized to allow a fastener and, more specifically, a head of a fastener to extend therethrough. In a first position, it is desirable for the plurality of fastener-receiving apertures 62a-62d to be generally coaxial with the plurality of fastener-receiving apertures 24a-24d to assist in inserting the fasteners more easily. It is contemplated that the fastener-receiving apertures of the plate may be formed in other shapes.

The plate 60 further forms an aperture 64 that is configured to receive the projection 50 (shown in FIG. 2) extending from the base 40. The aperture 64 is centrally formed in the plate 60. The plate 60 also includes a plurality of elongated notches 66a-66d. At least one of the plurality of elongated notches 66a-66d assists in securing the plate 60 in a second position with the security pin 70 as will be discussed below in detail. The plurality of elongated notches 66a-66d also assists in securing the plate 60 in a first position with the respective plurality of projections 52a-52d.

The plate 60 of FIG. 5 is configured to rotate in the retainer assembly from a first position to a second position, as will be discussed in detail below. In this embodiment, the plate 60 is adapted to rotate less than about 30 degrees in a clockwise direction (direction of arrow A). The plate is typically designed to rotate from about 15 to about 45 degrees and, more specifically, from about 15 to about 30 degrees.

It is contemplated that the plate may be designed to rotate further than the plate 60 by reconfiguring one or more of the following: the length of the fastener-receiving apertures, the size of the plate, or the downward movement of the security pin. For example, the plate may be configured to rotate less than about 45 degrees. It is contemplated that a retainer assembly may be designed such that the plate rotates counterclockwise as opposed to clockwise.

The security pin 70 is securely mounted on the base 40. The security pin 70 is a theft-resistant pin that assists in inhibiting or preventing the component (e.g., electronic device) from rotating clockwise and falling out. The security pin 70 is hidden in the retainer assembly 10 so a user will have great difficulty in accessing the security pin 70 and ultimately removing the component (e.g., electronic device). The security pin 70 is configured to move from a first position to a second position to secure the plate 60 from rotating counterclockwise back to its first position and potentially falling out.

The security pin 70 assists in securing the component (e.g., an electronic device) to the retainer assembly (e.g., retainer assembly 10 of FIG. 1). Referring to an interior view of the retainer assembly 10 in FIG. 5, the security pin 70 includes the spring 72 and a flange 74. Thus, the security pin 70 is a spring-loaded security pin. The spring 72 is biased downwardly (in the direction of arrow B in FIG. 5). The security pin 70 is mounted on the base 40. The indentation 54 (shown in FIG. 2) of the base 40 receives at least a portion of the security pin 70. The flange 74 and the indentation 54 of the base 40 assist in controlling the movement of the security pin 70.

Figure 6:
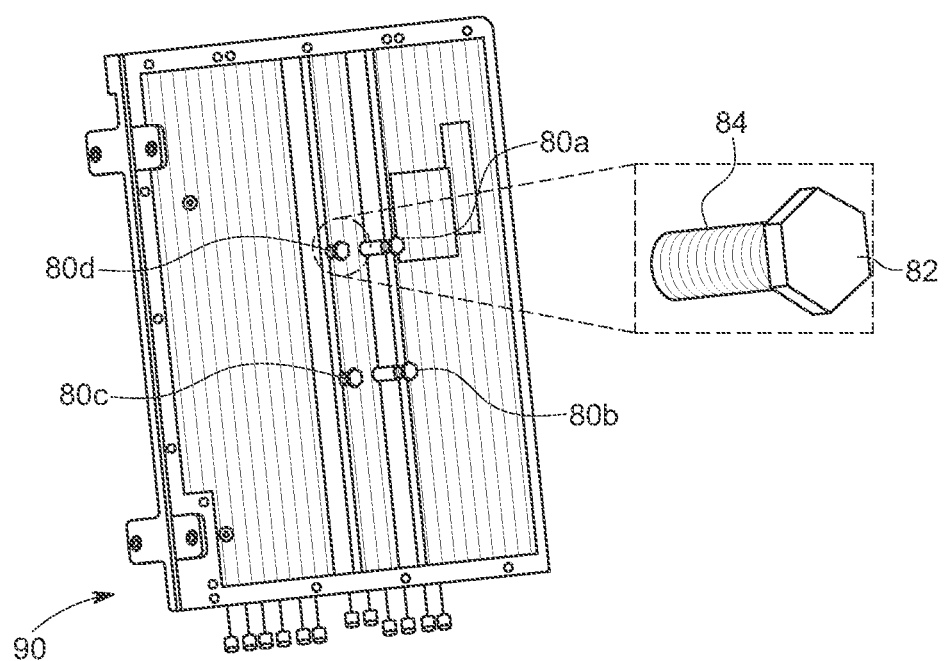
FIG. 6 is a front perspective view of a component (electronic device) with a plurality of fasteners secured therein, in accordance with one embodiment of the present disclosure.

FIG. 6 shows a non-limiting example of a component that can be used. FIG. 6 is in the form of an electronic device 90 with a plurality of fasteners 80a-80d. In one embodiment, the plurality of fasteners is a bolt. Each of the fasteners 80a-80d includes a head or face portion 82 and a body 84 of a reduced diameter. The body 84 includes a threaded portion in one embodiment. One non-limiting example of a bolt that may be used is a hex head bolt.

It is contemplated that other fasteners may be used such as a screw in other embodiments. The fastener to be used in the present invention would include a head or face portion and a body with a reduced diameter. It is contemplated that the fastener may not have a threaded portion, and in such an embodiment would be secured to a component (e.g., an electronic device) by another method. For example, the fastener may be secured to the component (e.g., electronic device) by, for example, welding.

Figure 7:
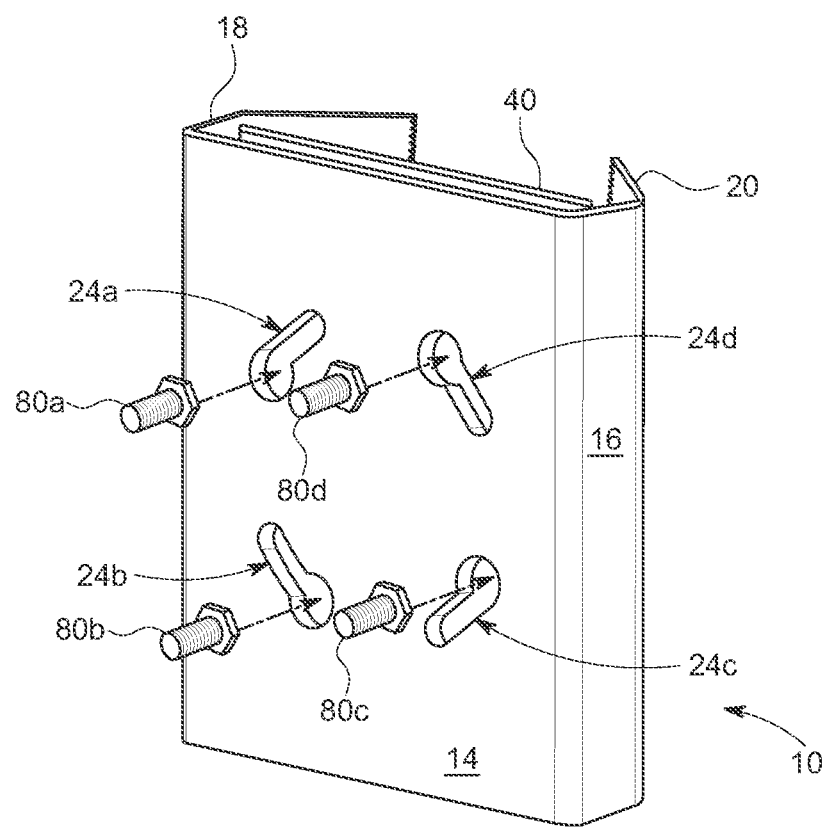
FIG. 7 is a top perspective view of the retainer assembly of FIG. 1 with a plurality of fasteners being positioned to enter fastener-receiving apertures formed in the bracket, in accordance with one embodiment of the present disclosure.

Referring to FIG. 7, the retainer assembly 10 further includes a plurality of fasteners 80a-80d configured to extend through the plurality of fastener-receiving apertures 24a-24d formed in the bracket 12, and the plurality of fastener-receiving apertures 62a-62d formed in the plate 60 (shown in FIG. 2).

Figure 8:
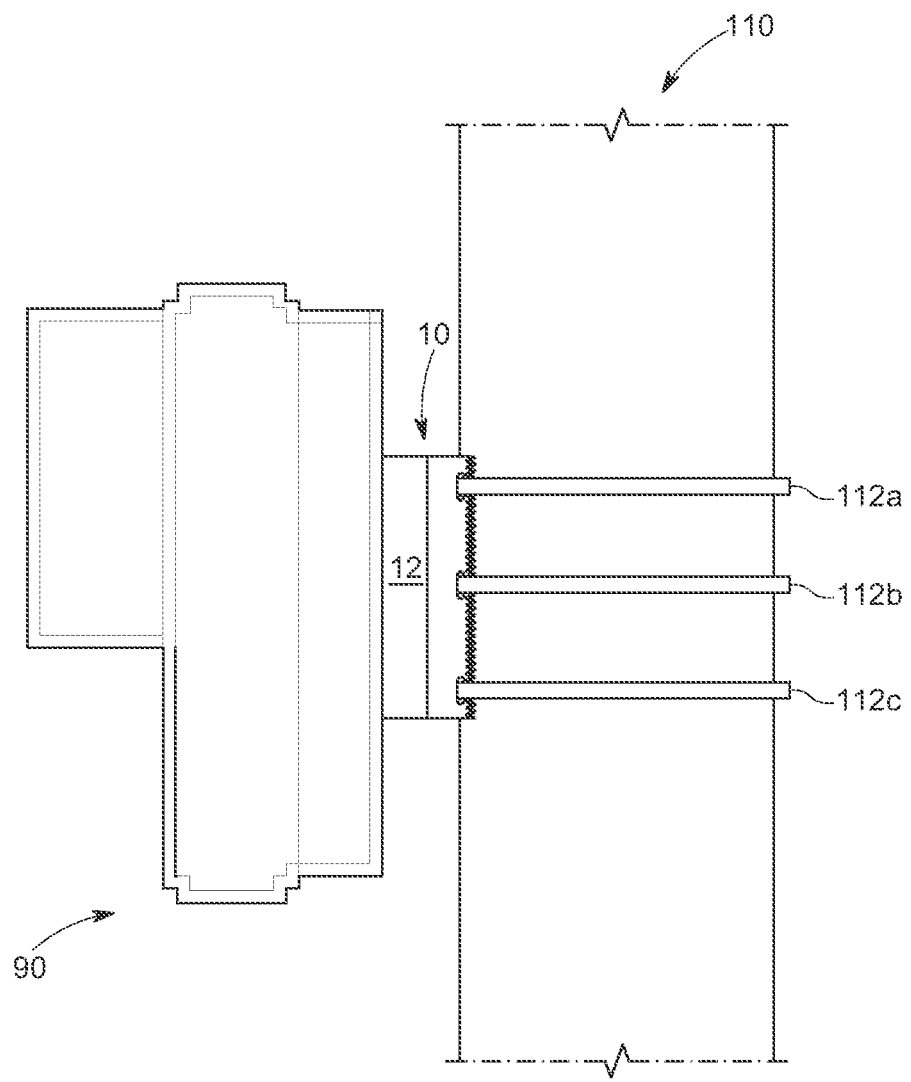
FIG. 8 is a partial side view of the retainer assembly and the component being attached to a structure, in accordance with one embodiment of the present disclosure.

Referring to FIG. 8, generally, the components (e.g., electronic devices) secured by the retainer assembly are located adjacent to the bracket and opposite of the plate and the base. More specifically, FIG. 8 illustrates one non-limiting example in which a component is in the form of the electronic device 90, which is also discussed above in FIG. 6. The electronic device 90 is located adjacent to the bracket 12 of the retainer assembly 10. In one embodiment, the electronic device 90 forms a plurality of apertures in which the plurality of fasteners is secured therein. The fasteners may be securely screwed in the electronic device 90. It is contemplated that other techniques for securing the fasteners in the electronic device 90 may be used as discussed above.

In one method of mounting and securing the retainer assembly to a structure, a plurality of fasteners is secured or assembled to a component. A retainer assembly and, more specifically, the bracket of the retainer assembly is secured to a structure (e.g., a pole). The fasteners on the component (e.g., electronic device) are inserted into the plurality of fastener-receiving apertures in the retainer assembly. The fasteners attached to the component are rotated within the fastener-receiving apertures to fix the retainer assembly into its desired and secure position. The present method is typically performed in the absence of tooling.

A hex head bolt is typically secured to the component (e.g., electronic device) by a wrench. This is typically done off-site from the installer. It is contemplated, however, that the hex head bolt may be secured to the component (e.g., electronic device) at the site.

The above method will be described, for example, with respect to retainer assembly 10 (bracket 12, the base 40, the plate 60 and security pin 70) and component 90 (e.g., electronic device) being secured to a structure 110.

Referring still to FIG. 8, the bracket 12 is secured to the structure 110 via the plurality of apertures 30a-30f (see FIGS. 4A, 4B) formed in the bracket 12. The structure 110 in this embodiment is a pole. In one embodiment, the bracket is secured to the structure by using at least one cable tie. The at least one cable tie extends through the plurality of apertures 30a-30f formed in the bracket 12 and around the structure 110. The bracket 12 is secured to the structure 110 by using a plurality of cable ties 112a-112c.

The cable ties may comprise one or more materials. For example, the cable ties comprise polymeric materials in one embodiment. In another example, the cable ties comprise metallic materials. One non-limiting metallic cable tie is a steel cable tie. A metallic cable tie may include a rubber or a plastic cover on at least a portion thereof so as to increase its friction with the structure (e.g., pole), and improve its corrosion resistance.

In FIG. 8, polymeric cable ties 112a, 112c and a metallic cable tie 112b are used. It is contemplated that the cable ties may be of the same type or different types than shown in FIG. 8. It is contemplated that other fastening methods may be used such as clamps, screws and nuts to secure the retainer assembly to the structure.

Referring back to FIGS. 2, 3 and 8, after the bracket 12 is secured to the structure 110, the plate 60 is located between the base 40 and at least a portion of the bracket 12 in which the plate 60 is placed on the projection 50 of the base 40 via the aperture 64 of the plate 60. Referring back to FIG. 7, each of the plurality of fasteners 80a-80d is aligned and extended through a respective one of the plurality of fastener-receiving apertures 24a-24d formed in the bracket 12, and through a respective one of the plurality of fastener-receiving apertures 62a-62d formed in the plate 60 (shown in FIG. 2). The plurality of fasteners 80a-80d will contact a respective one of the projections 48a-48d.

Figure 9A:
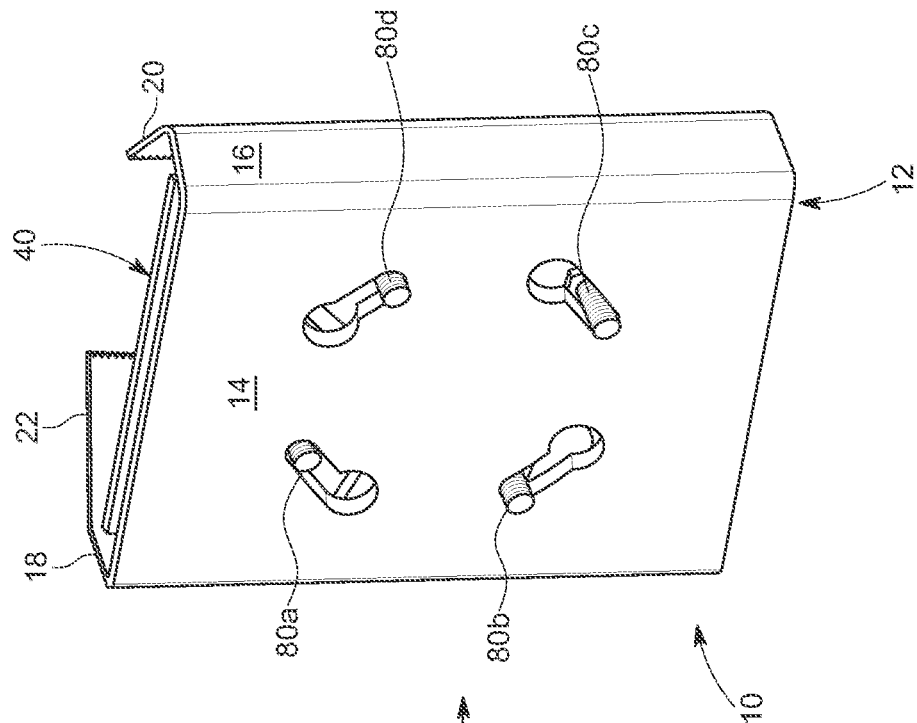
FIG. 9A is a front perspective view of the retainer assembly of FIG. 1 including fasteners in a first position in the absence of a component, in accordance with one embodiment of the present disclosure.
Figure 9B:
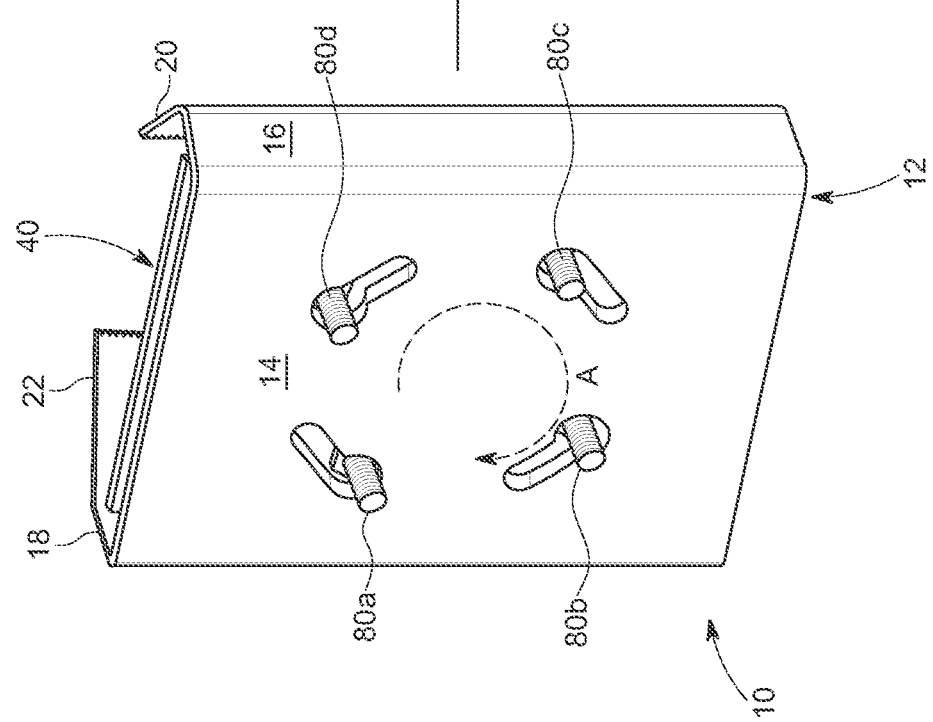
FIG. 9B is a front perspective view of the retainer assembly of FIG. 1 including the fasteners in a second position in the absence of a component, in accordance with one embodiment of the present disclosure.
Figure 10:
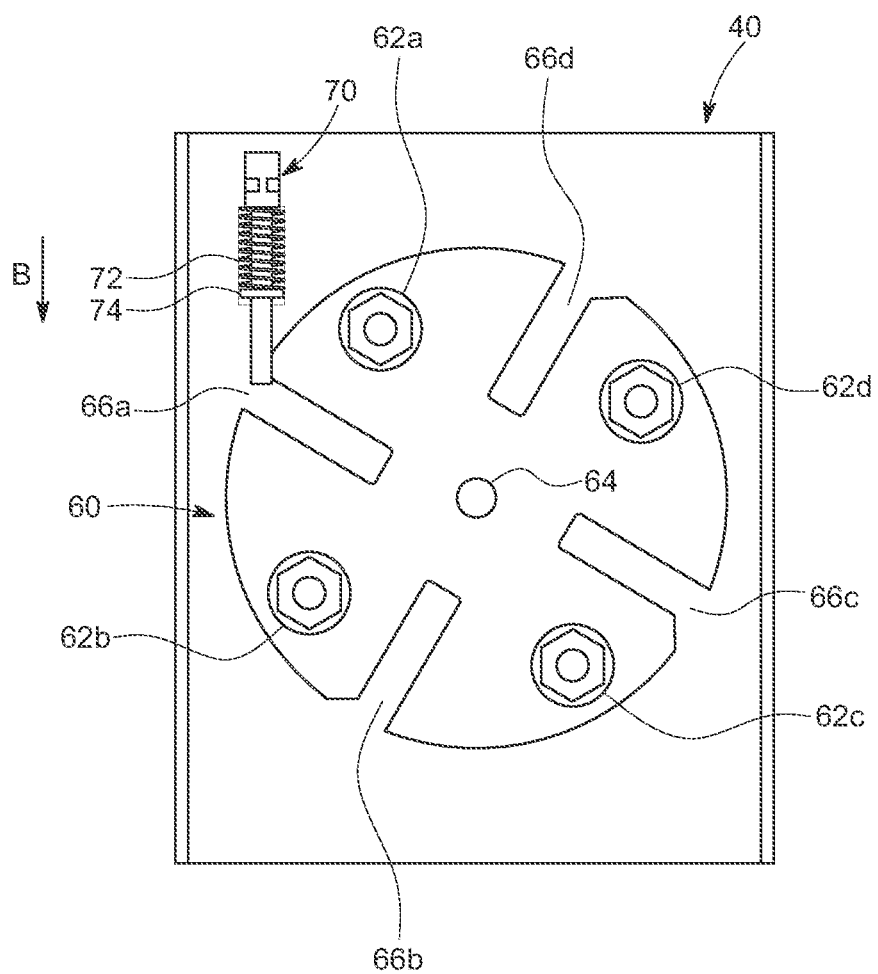
FIG. 10 illustrates a front view of an interior section of the retainer assembly of FIG. 1 depicting the plate being positioned on the base in a second position with fasteners, in accordance with one embodiment of the present disclosure.

Referring to FIGS. 9A and 9B, in which component 90 has been removed for clarity, the plurality of fasteners 80a-80d is moved in the plurality of fastener-receiving apertures from a first position to a second position. The plurality of fasteners 80a-80d is moved after the plurality of fasteners 80a-80d has been extended through each of the respective one of the plurality of fastener-receiving apertures formed in the bracket 12 and the plate 40. This is accomplished by moving the component 90, which in turn moves the plurality of fasteners 80a-80d in the clockwise direction of arrow A. This results in the plate 60 rotating from a first position (FIG. 5) to a second position (FIG. 10). The plate 60 is rotated clockwise from about 25 to about 35 degrees. This direction is shown in FIG. 5 in the direction of Arrow A.

The plate 60 is rotated around the projection 50 of the base 40. Initially, the security pin 70 is prevented or inhibited from being moved downward (direction of arrow B in FIG. 5) via the spring 72 by a periphery of the plate 60. This is shown in the first position of the security pin 70 in FIG. 5. As the plate 60 is rotated in the clockwise direction, the spring 72 of the security pin 70 extends in a downward direction (see arrow B in FIGS. 5 and 10).

Referring to FIG. 10, the security pin 70 engages one of the plurality of elongated notches 66a. At about the same time, the flange 74 of the security pin 70 engages an end of the indentation 54 formed in the base 40. Thus, the security pin 70 is prevented or inhibited from continued movement in the direction of arrow B by at least one of the flange 74, elongated notch 66a, or the combination thereof. When the plate 60 is in the second position, the retainer assembly 10 is locked, which retains the component 90.

It is contemplated that the order of the method may be formed sequentially, as described above. It is also contemplated that the steps of the method may be performed in a different order.

As discussed above, the retainer assembly 10, when locked, is difficult, if not impossible, to remove the component 90 (e.g., electronic device) therefrom. If a user wants to gain access to the component 90 (e.g., electronic device), then the security pin 70 needs to move back to its first position (see FIG. 5) from its second position (see FIG. 10). The security pin 70 may be moved from the second position back to the first position using a specific specialized tool in one embodiment.

Figure 11A:
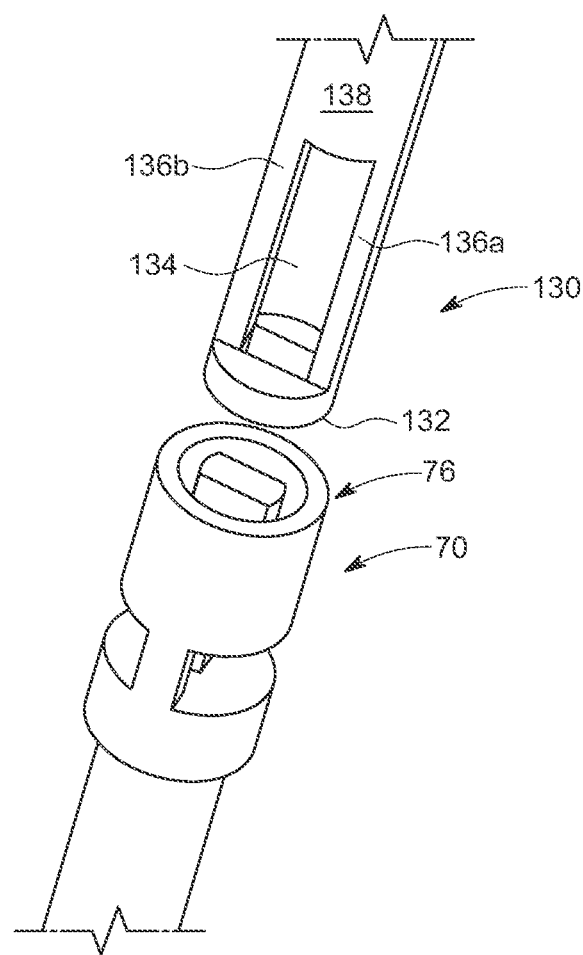
FIG. 11A is a top perspective view of a security pin before being engaged by a specialized tool, in accordance with one embodiment of the present disclosure.
Figure 11B:
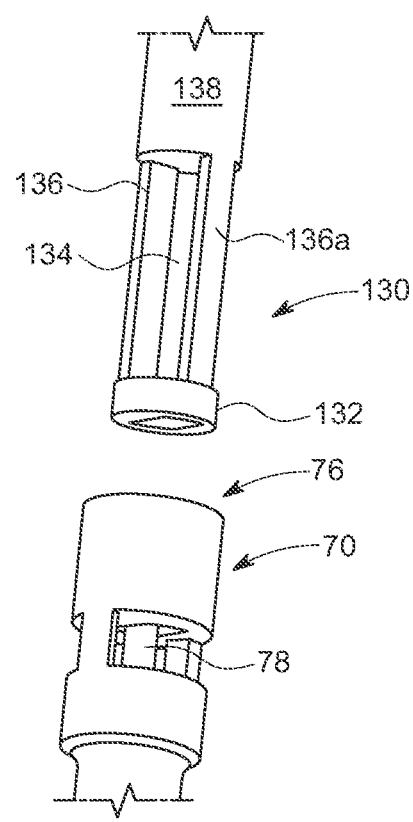
FIG. 11B a general side view of the security pin of FIG. 11A before being engaged by the specialized tool of FIG. 11A.
Figure 11C:
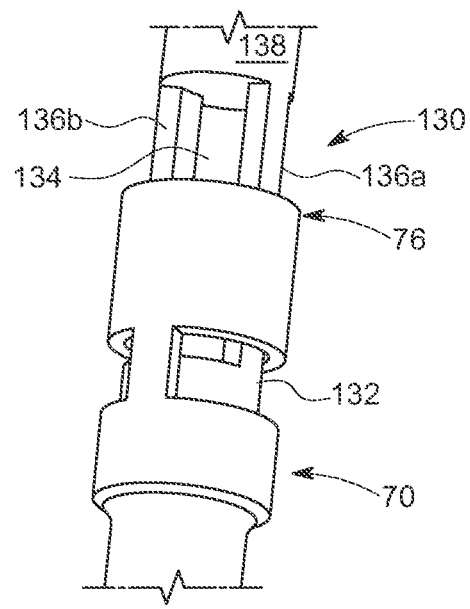
FIG. 11C is a bottom perspective view of the security pin of FIG. 11A after being engaged by the specialized tool of FIG. 11A.
Figure 11D:
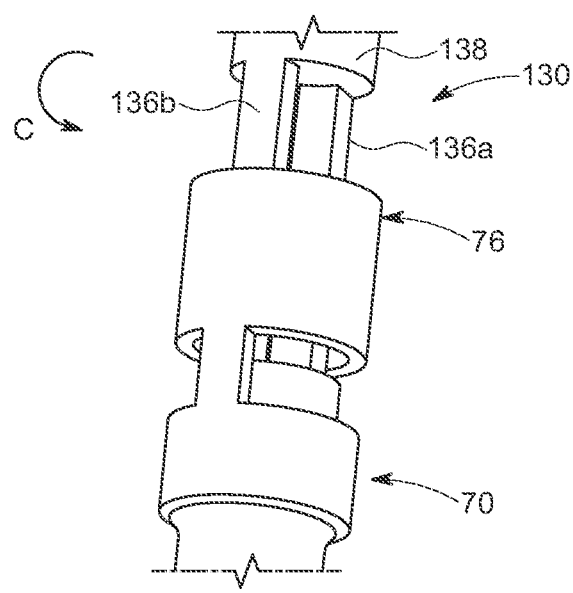
FIG. 11D is a bottom perspective view of the security pin of FIG. 11A after being engaged and rotated by the specialized tool of FIG. 11A.
Figure 11E:
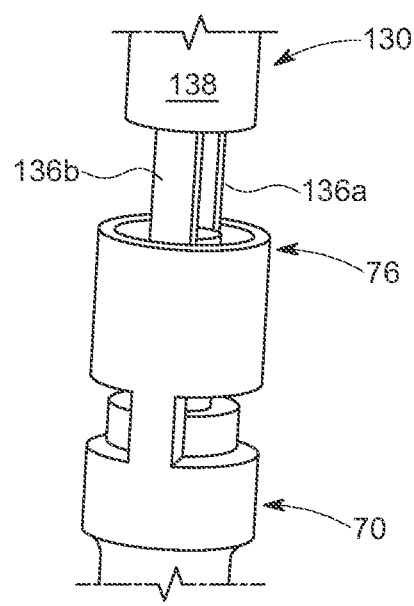
FIG. 11E is a side view of the security pin of FIG. 11A after being engaged and rotated by the specialized tool of FIG. 11A.

For example, referring to FIGS. 11A-11E, a specialized tool 130 assists in moving the security pin 70 from the second position (FIG. 10) to the first position (FIG. 5). Referring initially to FIGS. 11A, 11B, the specialized tool 130 has a circular shaped end 132 with a hollowed interior area 134 formed between two elongated extensions 136a, 136b extending from the circular shaped end 132 and a base 138.

The circular shaped end 132 of the specialized tool 130 fits into an end 76 of the security pin 70. After the circular shaped end 132 of the specialized tool 130 is inserted into the end 76 of the security pin 70 (FIG. 11C), the specialized tool 130 is rotated counterclockwise (direction of Arrow C) to the position in FIGS. 11D and 11E. The combination of the hollowed interior area 134 and a cylinder 78 (FIG. 11B) in the security pin 70 assists in rotating the security pin 70 by the specialized tool 130 after insertion thereto. The specialized tool 130, during rotation, acts like a hook such that the user can pull the security pin 70 via the specialized tool 130. After the security pin 70 is relocated to its first position (FIG. 5), the plurality of fasteners secured to the component (e.g., electronic device) can be moved from its second position to its first position in a counterclockwise movement, enabling the component to be removed.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A retainer assembly comprising:
    a bracket including at least a front section, a first side and a second opposing side, the front section of the bracket forming a plurality of fastener-receiving apertures configured to each receive a fastener therethrough;
    a base including a projection extending therefrom;
    a plate being located between the base and at least a portion of the bracket, the plate forming a plurality of fastener-receiving apertures configured to each receive a fastener therethrough, the plate further forming an aperture being configured to receive the projection extending from the base, the plate being configured to rotate in the retainer assembly from a first position to a second position; and
    a security pin being securely mounted on the base, the security pin being configured to move from a first position to a second position to inhibit the plate from rotating from its second position back to its first position.

2. The retainer assembly of claim 1 further including a plurality of fasteners configured to extend through the plurality of fastener-receiving apertures formed in the bracket, and the plurality of fastener-receiving apertures formed in the plate.

3. The retainer assembly of claim 2 further including an electronic device being located adjacent to the bracket and opposite of the plate, the electronic device securing the plurality of fasteners.

4. The retainer assembly of claim 1, wherein the bracket further includes at least one back section opposite of the front section, and wherein the bracket further forms a plurality of apertures configured to assist in attaching the retainer assembly to a structure.

5. The retainer assembly of claim 4, wherein the at least one back section of the bracket is a plurality of back sections, and wherein the plurality of apertures formed in the bracket is configured to assist in attaching the retainer assembly to the structure is formed in the plurality of back sections of the bracket.

6. The retainer assembly of claim 1, wherein the plate is configured to rotate less than about 45 degrees.

7. The retainer assembly of claim 6, wherein the plate is adapted to rotate from about 15 to about 40 degrees.

8. The retainer assembly of claim 6, wherein the plate is adapted to rotate from about 15 to about 30 degrees.

9. The retainer assembly of claim 1, wherein the plate further includes a plurality of elongated notches, at least one of the plurality of elongated notches and the security pin assisting in securing the plate in the second position.

10. The retainer assembly of claim 2, wherein each of the plurality of fasteners is a bolt.

11. The retainer assembly of claim 1, wherein the security pin includes a spring.

12. The retainer assembly of claim 11, wherein the security pin further includes a flange and wherein the base further forms an indentation therein configured to receive at least a portion of the security pin, the flange and the indentation assisting in controlling the movement of the security pin.

13. A method of assembling and securing a retainer assembly to a structure, the method comprising:
    providing a component with a plurality of fasteners secured thereto;
    providing a bracket, the bracket including at least a front section, a first side and a second opposing side, the front section of the bracket forming a plurality of fastener-receiving apertures, the bracket further forming a plurality of apertures for assisting in securing to the structure;
    securing the bracket to the structure via the plurality of apertures of the bracket;
    providing a base, the base including a projection extending therefrom, the base further including a security pin mounted thereon;
    providing a plate, the plate forming a plurality of fastener-receiving apertures and an aperture being configured to receive the projection extending from the base;
    locating the plate between the base and at least a portion of the bracket, and locating the plate on the projection of the base via the aperture formed in the plate;
    extending each of the plurality of fasteners through a respective one of the plurality of fastener-receiving apertures formed in the bracket, and through a respective one of the plurality of fastener-receiving apertures formed in the plate;
    after the plurality of fasteners have extended through each of the respective one of the plurality of fastener-receiving apertures formed in the bracket and the plate, moving the plurality of fasteners in the plurality of fastener-receiving apertures from a first position to a second position resulting in the plate rotating from the first position to the second position; and
    moving the security pin from a first position to a second position so as to lock the plate in the second position and secure the component.

14. The method of claim 13, wherein the securing of the bracket to the structure includes securing at least one cable tie through the plurality of apertures formed in the bracket and around the structure.

15. The method of claim 14, wherein the at least one cable tie is a plurality of cable ties.

16. The method of claim 13, wherein the structure is a pole.

17. The method of claim 13, wherein the component is an electronic device.

18. The method of claim 13, wherein the method is performed in the absence of tools.

19. The method of claim 13, wherein the plate is adapted to rotate from about 15 to about 45 degrees.

20. The method of claim 13, wherein the security pin includes a spring and a flange, and wherein the base further forms an indentation therein configured to receive at least a portion of the security pin, the flange and the indentation assisting in controlling the movement of the security pin.

* * * * *